United States Patent [19]

Majerus et al.

[11] Patent Number: 5,017,127
[45] Date of Patent: May 21, 1991

[54] SELF ALIGNING NOZZLE FOR INJECTION MOLDING

[75] Inventors: Norbert Majerus; Larry E. Chlebina; John S. Rambacher, all of Akron, Ohio

[73] Assignee: The Goodyear Tire & Rubber Company, Akron, Ohio

[21] Appl. No.: 510,720

[22] Filed: Apr. 18, 1990

[51] Int. Cl.$^5$ .............................................. B29C 45/22
[52] U.S. Cl. ................................. 425/549; 264/328.8; 264/328.15; 425/568; 425/569; 425/572; 425/588
[58] Field of Search ............... 425/543, 547, 548, 549, 425/562, 564, 568, 569, 570, 571, 572, 588, DIG. 227, 115, 129.1; 264/297.2, 328.8, 328.15

[56] References Cited

U.S. PATENT DOCUMENTS

| | | | |
|---|---|---|---|
| 3,809,519 | 5/1974 | Garner | 425/245 |
| 3,915,610 | 10/1975 | Kohler | 425/248 |
| 4,589,839 | 5/1986 | Kurumaji et al. | 425/547 |
| 4,652,230 | 3/1987 | Osuma-Diaz | 425/549 |
| 4,676,730 | 6/1987 | Yamasaki | 425/569 |
| 4,787,840 | 11/1988 | Gellert | 425/549 |
| 4,793,795 | 12/1988 | Schmidt et al. | 425/549 |
| 4,808,355 | 2/1989 | Kamiyami et al. | 264/39 |
| 4,826,416 | 5/1989 | Majerus et al. | 425/115 |

Primary Examiner—Timothy Heitbrink
Attorney, Agent, or Firm—Frederick K. Lacher; T. P. Lewandowski

[57] ABSTRACT

A nozzle assembly for mounting on a cold runner block has a cooled housing with a bore and a nozzle member with a shaft portion mounted in the bore for rotation about a bore axis. A cap portion of the nozzle member is connected to the shaft portion and has a surface for positioning close to the mold surface of a mold member. A mold cavity in the mold member has a mold orifice in the mold surface for alignment with a nozzle opening in the surface of the cap portion. The nozzle opening is positioned radially outward from the bore axis and is rotatable into alignment with the mold orifice upon rotation of the nozzle member. A nozzle passage extends from the nozzle opening to the bore for communicating a fluid molding material to the mold cavity. A spring device may be disposed between the housing and the nozzle member to urge the surface of the nozzle member towards the mold surface. A ball member with a flat sealing surface may be mounted in a spherical recess in the surface of the cap portion. The nozzle opening is in the flat sealing surface so that upon alignment of the nozzle opening with the mold orifice the ball member can rotate in the spherical recess and provide sealing engagement of the flat sealing surface with the flat mold surface of the mold member.

9 Claims, 4 Drawing Sheets

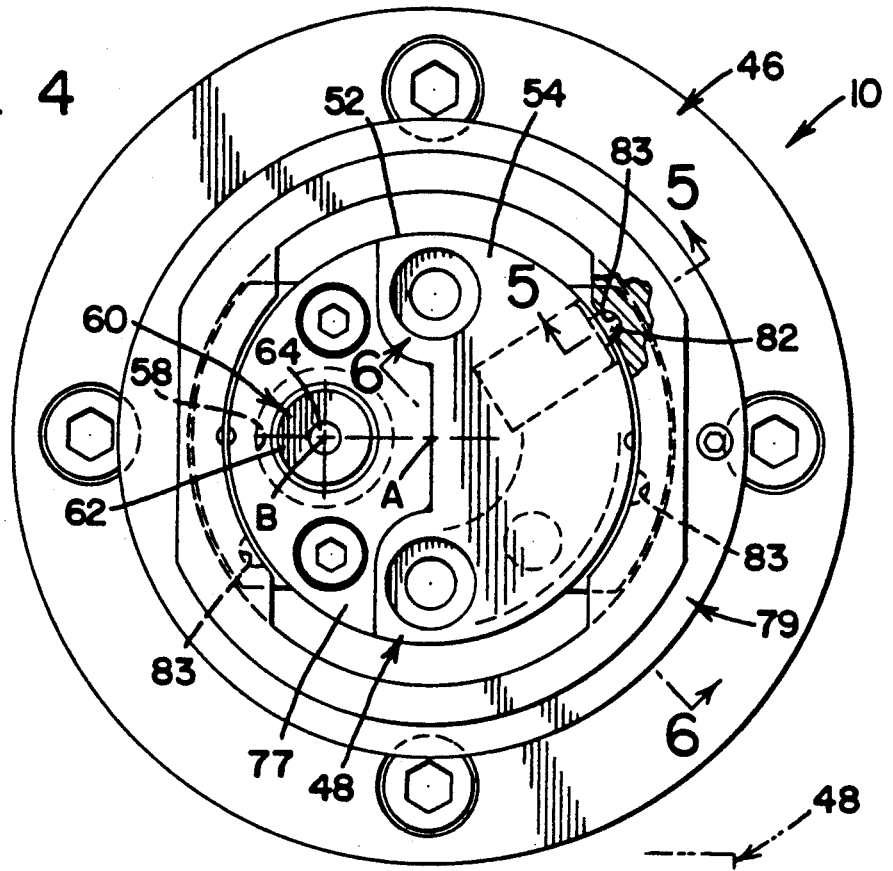
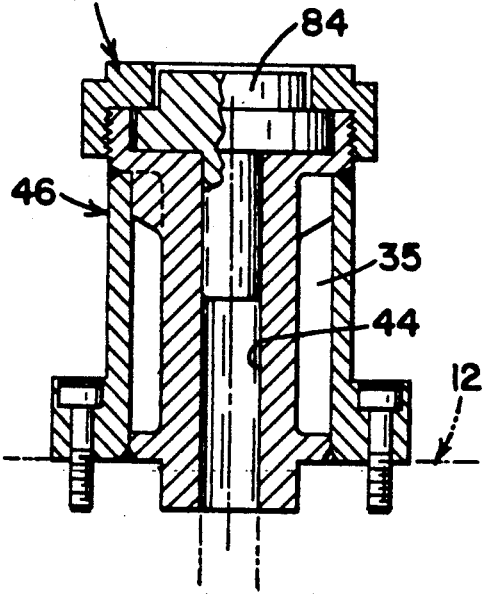
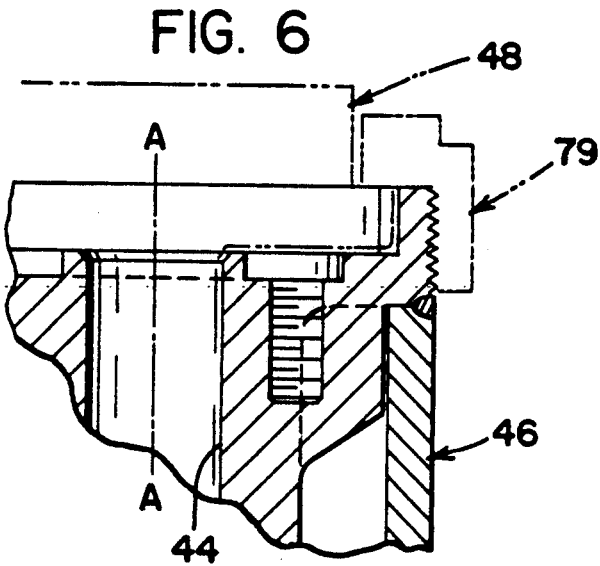

SELF ALIGNING NOZZLE FOR INJECTION MOLDING

This invention relates to injection molding and especially to molding circular objects such as tire treads. An example of a system for injection molding tire treads is shown and described in U.S. Pat. No. 4,826,416 dated May 2, 1989. The fluid molding material such as rubber is injected through a cold runner block into cooled nozzles attached to the runner block which communicate the rubber to mold orifices leading to a plurality of circumferentially spaced gates along at least one side of the mold cavity.

With this system, it is desirable to use different molds and this has resulted in variations in mold height and flatness which has caused problems with sealing between the mold and the nozzle to prevent leakage. The variation in temperature between the mold and the cold runner block has also caused sealing problems. For example, the temperature of the mold may be around 380° F. (193° C.) while the temperature of the cold runner may be around 120° F. (49° C.).

Heretofore, the nozzles have been fixed with the nozzle openings located at one diameter which has limited the use of the apparatus for molding only treads with only that diameter whereas it is desirable to use the same apparatus for molding treads of several different diameters.

The present invention provides an apparatus which is adaptable for injection molding several sizes of circular articles having different diameters by providing a nozzle assembly having a nozzle member rotatable in a housing so that the nozzle opening may be moved to different radial positions relative to the mold during rotation. Resilient means is provided between the nozzle member and the housing to urge the surface of the nozzle member towards the mold surface and resist back pressure of a fully injected mold to maintain the seal. To compensate for variations in the surface alignment of the mold, a ball member with a flat sealing surface is mounted in a spherical recess in the surface of the nozzle for sealing engagement with the mold surface. The nozzle opening is positioned in the flat sealing surface for alignment with the mold orifice and provides sealing engagement of the flat sealing surface with the surface of the mold member. A sliding bolt or other suitable means is provided to lock the nozzle member in position in the housing.

In accordance with an aspect of the invention, there is provided a nozzle assembly for communicating a fluid molding material between a first mold part and a second mold part comprising a housing mounted on the first mold part, the housing having a bore in communication with a source of fluid molding material, a nozzle member positioned between the housing and the second mold part, the nozzle member having a shaft portion mounted in the bore and a cap portion connected to the shaft portion, the cap portion having a surface positioned close to the surface of the second mold part, a mold cavity in the second mold part, a nozzle opening in the surface of the cap portion positioned in alignment with a mold orifice in the surface of the second mold part, the mold orifice being in communication with the mold cavity, a nozzle passage in the nozzle member extending between the nozzle opening and the bore and means to move the nozzle member in the housing to position the nozzle opening in alignment with the mold orifice.

BRIEF DESCRIPTION OF THE DRAWINGS

To acquaint persons skilled in the arts most closely related to the present invention, a certain preferred embodiment thereof illustrating a best mode now contemplated for putting the invention into practice is described herein by and with reference to the annexed drawings forming a part of the specification. The embodiment shown and described herein is illustrative and as will become apparent to those skilled in these arts, can be modified in numerous ways within the spirit and scope of the invention defined in the claims hereof.

In the annexed drawings:

FIG. 3 is a sectional view of the nozzle housing showing a plug member installed to close the bore;

FIG. 4 is a plan view of the nozzle assembly taken along the line 4—4 in FIG. 1;

FIG. 5 is a fragmentary sectional view of the cap retainers taken along the line 5—5 in FIG. 4;

FIG. 6 is a fragmentary sectional view of the nozzle housing taken along the line 6—6 in FIG. 4;

Referring to FIGS. 1 and 2, a nozzle assembly 10 embodying the invention is shown mounted on a first mold part such as a cold runner block 12 which may be supported on a plate member (not shown) of a tire press. As shown in FIG. 2, a bottom hot plate 14 is supported on the cold runner block 12 with suitable insulation 16 interposed between the hot plate and the 10 cold runner block. A second mold part such as a segmental mold assembly 18 is supported on an upper member of the tire press and includes a core 20, mold segments 24, and mold segment slide blocks 26 contained by a container ring (not shown). In the closed position shown, each of the mold segments 24 is in the closed position and defines a mold cavity 28 with the core 20. A plurality of circumferentially spaced gates 30 are positioned along at least one side of the mold cavity 28 and are connected to a mold orifice 32 adjacent each nozzle assembly 10.

Figure 1:
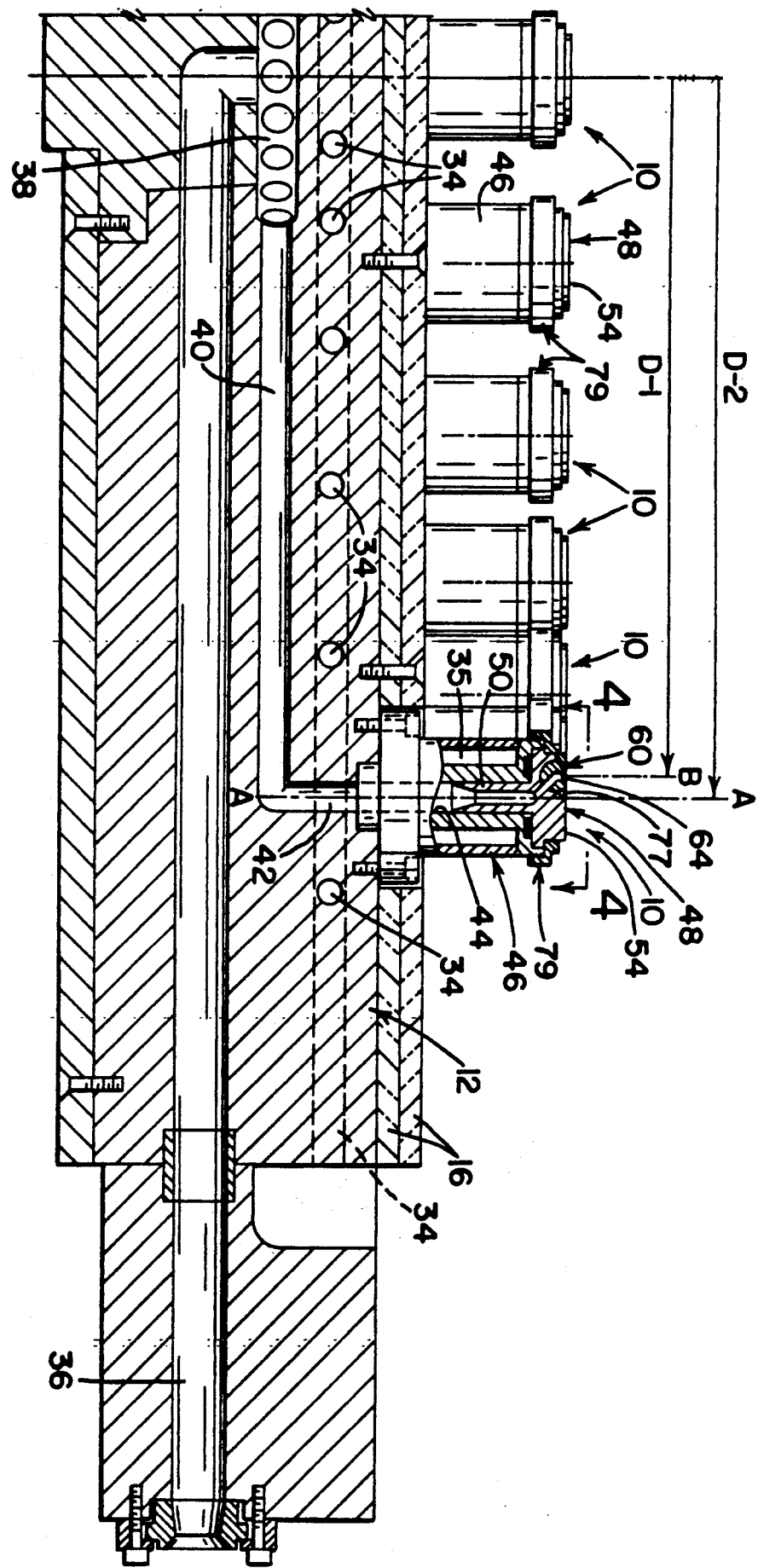
FIG. 1 is a sectional view of a cold runner block and nozzle assembly embodying the invention with parts being broken away.

The cold runner block 12 and the nozzle assembly 10 are cooled by a suitable cooling medium such as water which is circulated through cooling passages 34 and 35 so that the fluid molding material remaining in the nozzle assemblies and in the cold runner block is prevented from curing. The fluid molding material is injected through an inlet passage 36 in communication with a manifold 38 at a central location. The fluid molding material is then conveyed by radially extending passages 40 to nozzle passages 42 in communication with a cylindrical bore 44 of a nozzle housing 46. The bore has an axis A—A which may be coaxial with the nozzle passage 42. Rotatably mounted in the bore 44 is a nozzle member 48 having a shaft portion 50 and a cap portion 52. The shaft portion 50 is cylindrical and has substantially the same outer diameter as the inner diameter of the cylindrical bore 44. The cap portion 52 has an outer diameter greater than the diameter of the cylindrical bore 44 so that the edges overlap the nozzle housing 46.

Figure 10:
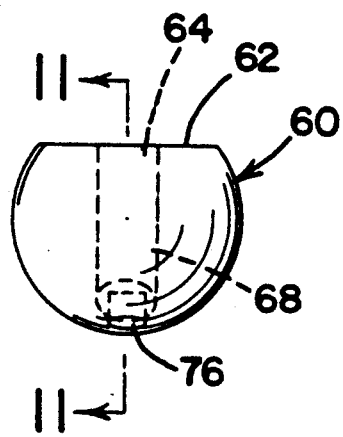
FIG. 10 is an elevation of the ball.
Figure 11:
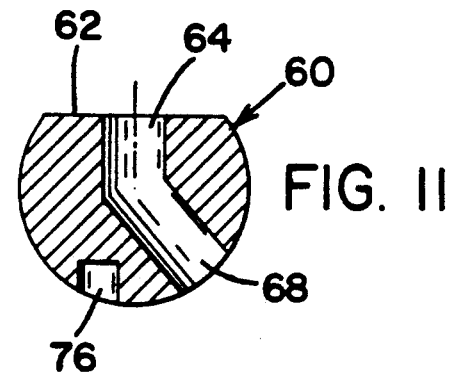
FIG. 11 is a sectional view of the ball taken along line 11—11 of FIG. 10.

The cap portion 52 has a surface 54 next to a mold surface 56 of the segmental mold assembly 18. A spherical recess 58 is provided in the surface 54 of the cap portion 52 for receiving a ball member 60 shown in greater detail in FIGS. 10 and 11. The ball member 60 is preferably of a rust proof material which has a relatively low coefficient of heat transmission such as stainless steel. The ball member 60 has a flat sealing portion 62 for engagement with the mold surface 56. A nozzle opening 64 is provided in the flat sealing portion 62 of the ball member 60 and is connected by a nozzle passage 66 to the bore 44. The nozzle passage 66 includes a ball member passage 68, a cap portion passage 70 and a shaft passage 72. The ball member passage 68 and the cap portion passage 70 are held in alignment by a pin 75 mounted on the cap portion 52 in the spherical recess 58 and engaging a bore 76 in the ball 62.

Figure 8:
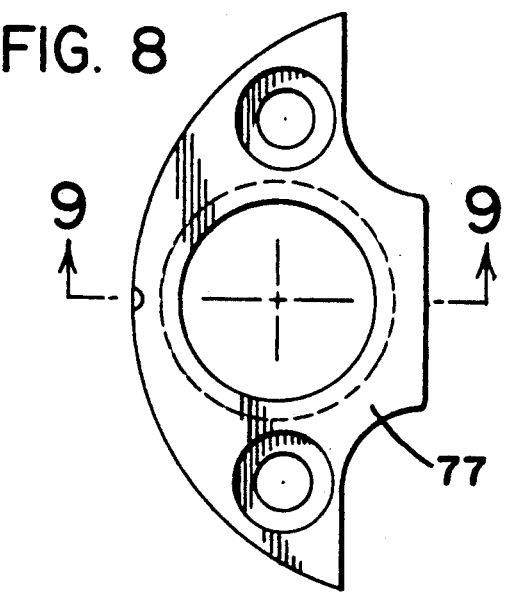
FIG. 8 is a plan view of the ball retainer.
Figure 9:
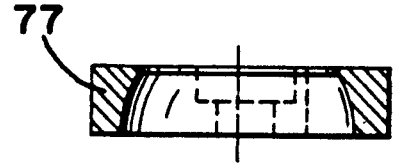
FIG. 9 is a sectional view taken along line 9—9 in FIG. 8.

The ball 62 is retained in the spherical recess 58 by a ball retainer plate 77 shown in greater detail in FIGS. 8 and 9. The nozzle member 48 is retained in the nozzle housing 46 by cap retainer plate 79 threaded on the housing 46.

Axial movement of the nozzle member 48 in the nozzle housing along the axis A—A is permitted and resilient means such as springs which may be Bellville springs 81 are positioned between the cap portion 52 and the housing 46. A heat conducting grease 88 fills the space between the cap portion 52 and the housing 46. By means of the Bellville springs 81, the surface 54 of the nozzle member 48 is urged towards the mold surface 56 and the flat sealing portion 62 of the ball member is urged into engagement with the mold surface and can rotate to conform with the mold surface.

Figure 2:
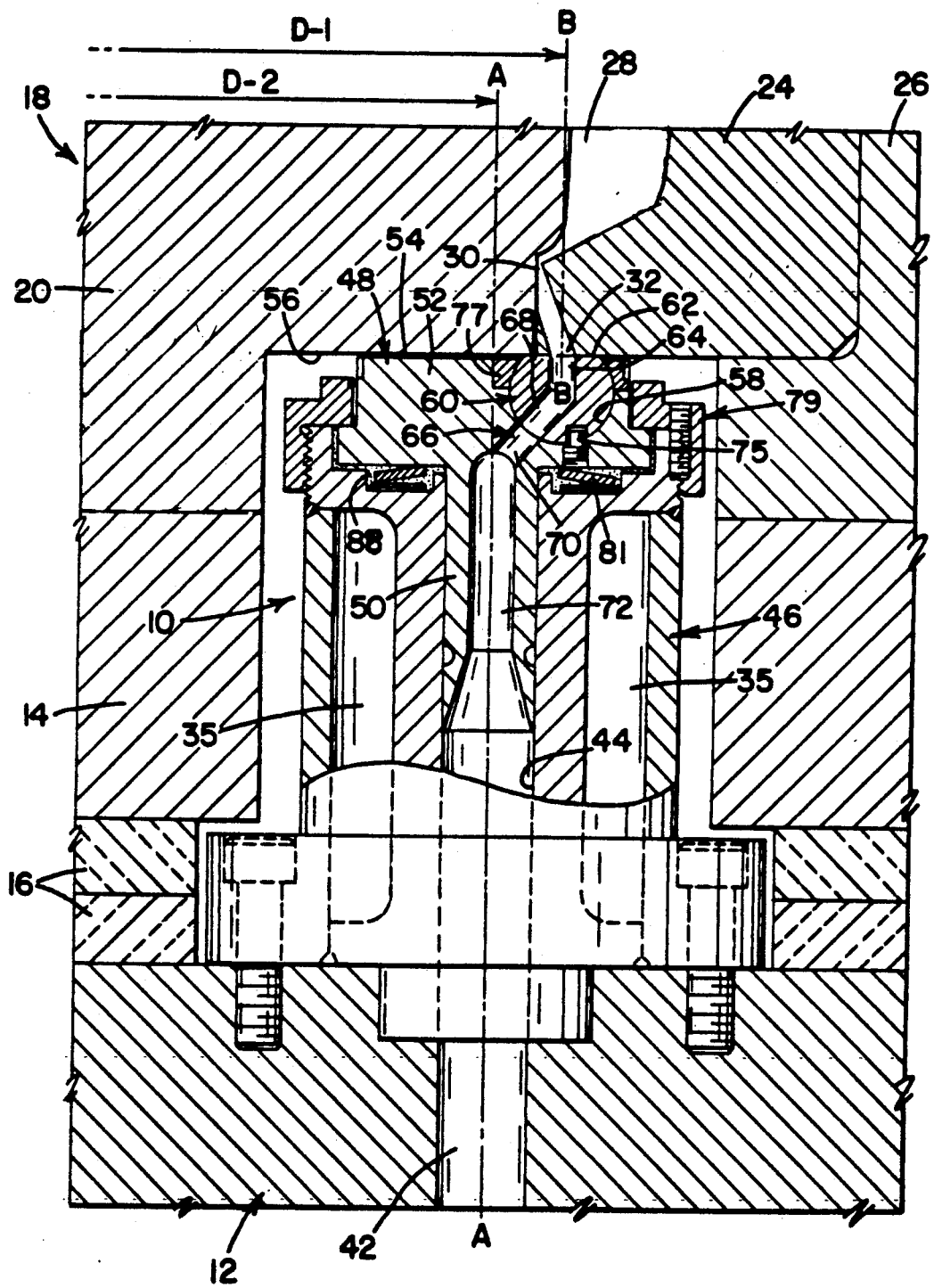
FIG. 2 is an enlarged fragmentary sectional view of the nozzle assembly shown in FIG. 1 in an alternate position in engagement with the segmental mold and the mold orifice being in alignment with the nozzle opening.
Figure 7:
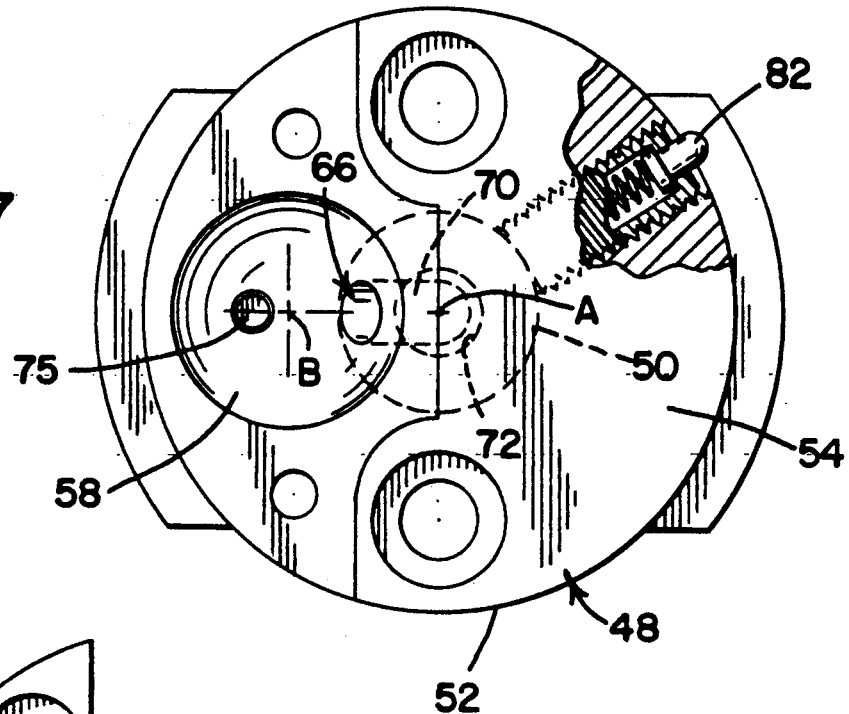
FIG. 7 is a plan view of the top of the nozzle assembly with the ball retainer, the ball and cap retainers removed.

As shown in FIGS. 2 and 4, the nozzle opening 64 has an axis B—B which is offset from the bore axis A—A. This provides for injecting fluid molding material into mold cavities 28 of different diameters. This is illustrated in FIGS. 1 and 2 where the diameter D-1 of the nozzle opening 64 and mold orifice 32 is less than the diameter D-2 of the bore axis A—A in FIG. 1 and greater than the diameter D-2 of the bore axis A—A in FIG. 2. The diameter adjustment is made by rotating the nozzle member 48 to predetermined positions and locking the nozzle member with suitable means such as a sliding bolt 82 extending through the cap portion 52 and engaging an indent 83 in the cap retainer plate 79 as shown in FIG. 5.

As shown in FIG. 3, the nozzle housing may be capped by inserting a plug member 84 in the bore 44 where it is retained by the plate 79 when it is desired to use less than the number of nozzle assemblies 10 mounted in the cold runner block 12.

While a representative embodiment and details have been shown for the purpose of illustrating the invention, it will be apparent to those skilled in the art that various changes and modifications may be made therein without departing from the spirit or scope of the invention.

What is claimed is:

1. A nozzle assembly for communicating a fluid molding material between a first mold part and a second mold part, said nozzle assembly comprising a housing mounted on said first mold part, said housing having a bore in communication with a source of fluid molding material, a nozzle member positioned between said housing and said second mold part, said nozzle member having a shaft portion mounted in said bore and a cap portion connected to said shaft portion, said cap portion having a surface positioned close to a surface of said second mold part, a mold cavity in said second mold part, a nozzle opening in said surface of said cap portion being positioned in alignment with a mold orifice in said surface of said second mold part, said mold orifice being in communication with said mold cavity, a nozzle passage in said nozzle member extending between said nozzle opening and said bore, and said nozzle member being movable in said housing to position said nozzle opening in alignment with said mold orifice.

2. The nozzle assembly of claim 1, wherein said bore is cylindrical and has a bore axis, said shaft portion is rotatable in said bore about said bore axis and said nozzle opening is disposed in a position offset radially from said bore axis and said nozzle member is rotatable about said bore axis to position said nozzle opening at different positions for alignment with said mold orifice at different positions on said surface of said second mold part.

3. The nozzle assembly of claim 2, wherein rotation of said shaft portion in said bore of said nozzle member is adjustable for positioning said nozzle opening in alignment with said mold orifice at said different positions.

4. The nozzle assembly of claim 3, including lock means for holding said nozzle member in a desired position after rotation to a position with said nozzle opening in alignment with said mold orifice.

5. The nozzle assembly of claim 4, wherein said lock means includes a sliding bolt member in said nozzle member moveable into engagement with an indent in said housing.

6. The nozzle assembly of claim 1, including resilient means positioned between said housing and said nozzle member for urging said surface of said nozzle member towards said mold surface of said second mold part to provide a seal around said nozzle opening and said mold orifice.

7. The nozzle assembly of claim 6, wherein said cap portion has a spherical recess in said surface of said nozzle member with a ball member rotatably mounted in said spherical recess, said ball member having a flat sealing portion for engagement with said mold surface of said second mold part, said nozzle opening being located in said flat sealing portion and said nozzle passage including a ball portion passage in said ball member in communication with a cap member passage in said cap member and a shaft passage in said shaft portion to communicate said fluid molding material from said bore to said nozzle opening.

8. The nozzle assembly of claim 7, wherein said resilient means includes a Bellville spring.

9. The nozzle assembly of claim 7, wherein said ball member has a spherical surface with a groove in said surface and said cap portion has a pin member mounted on said spherical surface and extending into said groove for controlling the rotation of said ball member in said spherical recess to maintain alignment of said ball portion passage with said cap member passage.

* * * * *